(12) United States Patent
Heninger et al.

(10) Patent No.: US 9,075,645 B2
(45) Date of Patent: *Jul. 7, 2015

(54) AUTOMATICALLY SELECTING OPTIMAL TRANSPORT PROTOCOL IN A CLOUD COMPUTING ENVIRONMENT

(71) Applicant: International Business Machines Corporation, Armonk, NY (US)

(72) Inventors: Ivan M. Heninger, Selma, NC (US); Curtis Hrischuk, Holly Springs, NC (US); Zachary H. Jones, Apex, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,585

(22) Filed: Apr. 22, 2013

(65) Prior Publication Data

US 2013/0247041 A1    Sep. 19, 2013

Related U.S. Application Data

(63) Continuation of application No. 13/356,199, filed on Jan. 23, 2012.

(51) Int. Cl.
  *G06F 9/455* (2006.01)
  *G06F 9/46* (2006.01)

(52) U.S. Cl.
  CPC ........ *G06F 9/45533* (2013.01); *G06F 9/45558* (2013.01); *G06F 2009/45595* (2013.01)

(58) Field of Classification Search
  None
  See application file for complete search history.

(56) References Cited

U.S. PATENT DOCUMENTS

| 8,429,276 | B1 * | 4/2013 | Kumar et al. | 709/226 |
| 8,429,675 | B1 * | 4/2013 | Radhakrishnan et al. | 719/319 |
| 2008/0222638 | A1 * | 9/2008 | Beaty et al. | 718/100 |
| 2009/0083756 | A1 * | 3/2009 | Kim et al. | 719/312 |
| 2009/0204826 | A1 * | 8/2009 | Cox et al. | 713/320 |

(Continued)

OTHER PUBLICATIONS

Mell et al., "The NIST Definition of Cloud Computing," Special Publication 800-145, Sep. 2011.

(Continued)

*Primary Examiner* — Abdullah Al Kawsar
*Assistant Examiner* — Bradley Teets
(74) *Attorney, Agent, or Firm* — Robert A. Voigt, Jr.; Winstead, P.C.

(57) ABSTRACT

A method, system and computer program product for selecting an optimal transport protocol in a cloud computing environment. An application creates a socket to communicate with a destination Virtual Machine (VM). The application requests a daemon agent to query a virtual machine manager to determine if the destination VM is on the same hypervisor as the application. The daemon agent receives a VMCI address ("context ID") and an indication of the hypervisor associated with the destination VM from the virtual machine manager. The daemon agent enables the transport layer to route traffic over the VMCI protocol to the destination VM using its context ID in response to the destination VM being on the same hypervisor as the application. In this manner, the application is able to route traffic using an optimal transport protocol, including VMCI, depending on peer hypervisor association without requiring any code modifications to the application.

6 Claims, 7 Drawing Sheets

(56) References Cited

U.S. PATENT DOCUMENTS

| | | |
|---|---|---|
| 2010/0228934 A1* | 9/2010 | Chandrasekaran et al. .. 711/162 |
| 2011/0022812 A1 | 1/2011 | Van der Linden et al. |
| 2011/0277027 A1 | 11/2011 | Hayton et al. |
| 2011/0314466 A1 | 12/2011 | Berg et al. |
| 2011/0320606 A1 | 12/2011 | Madduri et al. |
| 2012/0236761 A1* | 9/2012 | Yang et al. .................. 370/259 |
| 2013/0139155 A1* | 5/2013 | Shah ................................ 718/1 |
| 2013/0185436 A1* | 7/2013 | Carlin et al. ................. 709/226 |

OTHER PUBLICATIONS

"Riverbed Optimization System (RIOS) 6.1," riverbed.com/docs/TechOverview-Riverbed-RiOS.pdf, Riverbed Technology 2010, p. 1-27.

"VMCI Sockets Programming Guide," vmware.com/pdf/ws8_esx5_vmci_sockets.pdf, 2011.

Office Action from U.S. Appl. No. 13/356,199 dated Mar. 11, 2014, pp. 1-23.

* cited by examiner

US 9,075,645 B2

AUTOMATICALLY SELECTING OPTIMAL TRANSPORT PROTOCOL IN A CLOUD COMPUTING ENVIRONMENT

CROSS-REFERENCE TO RELATED APPLICATIONS

The present application is a continuation application of pending U.S. patent application Ser. No. 13/356,199, which was filed on Jan. 23, 2012, which is assigned to the assignee of the present invention. The present application claims priority benefits to U.S. patent application Ser. No. 13/356,199.

TECHNICAL FIELD

The present invention relates to cloud computing, and more particularly to automatically selecting the optimal transport protocol (e.g., Virtual Machine Communication Interface (VMCI), Transmission Control Protocol (TCP)) in a cloud computing environment.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In computer networking, the transport layer provides end-to-end communication services for applications within a layered architecture of network components and protocols. The transport layer provides convenient services, such as connection-oriented data stream support, reliability, flow control and multiplexing. Examples of transport protocols include the Transmission Control Protocol (TCP) and the Virtual Machine Communication Interface (VMCI) protocol. The VMCI is an infrastructure that provides fast and efficient communication between a virtual machine and the host operating system and between two or more virtual machines on the same host (i.e., the same physical real computer). VMCI is advantageous over TCP in that the throughput for VMCI may be significantly greater than the throughput for TCP/IP. However, there are some limitations in using VMCI.

For example, in order to implement the VMCI protocol, the application developer needs to make code modifications to make the application aware of the VMCI protocol. Such a requirement to make code modifications is a hindrance to enterprise level adoption due to the high cost of re-testing.

Furthermore, in a virtualized computer environment, such as may be implemented in a cloud computing node of the cloud computing environment, the VMCI protocol only provides communication within the local hypervisor. In a virtualized computer, the computer includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of physical resources of the computer. A guest operating system runs on each guest, and the guest appears to the guest operating system as a real computer. Each guest operating system may host one or more virtual machines.

Since the VMCI protocol only provides communication within the local hypervisor, the VMCI sockets (socket provides a bidirectional communication endpoint for sending and receiving data with another socket) only communicate from guest to guest as well as between a guest to a host on a single host. VMCI sockets cannot be used for communicating between virtual machines running on two separate physical machines or from one host to another host across a network. Instead, the application has to rely upon TCP/IP to communicate with external hosts.

Since the application layer (application layer contains all protocols and methods that fall into the realm of process-to-process communications) does not have visibility to the underlying virtual infrastructure to determine whether it should communicate over VMCI (if communicating on the same host) or over TCP (if communicating over a different host), the application resorts to using TCP since virtual machines can migrate to new hosts as workload demands change.

As a result, despite the benefits of using the VMCI protocol over the TCP protocol, the use of the VMCI protocol in a virtualized computer environment in a cloud computing node of the cloud computing environment is currently impractical.

BRIEF SUMMARY

In one embodiment of the present invention, a method for selecting an optimal transport protocol in a cloud computing environment comprises creating a socket to communicate with a destination virtual machine by an application. The method further comprises requesting a daemon agent to query a virtual machine manager to determine if the destination virtual machine is on a same hypervisor as the application. Additionally, the method comprises receiving a context identification of the destination virtual machine and an indication of a hypervisor associated with the destination virtual machine from the virtual machine manager. In addition, the method comprises enabling, by a processor, a transport layer to route traffic over a first transport protocol to the destination virtual machine using the context identification of the destination virtual machine in response to the destination virtual machine being on the same hypervisor as the application.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
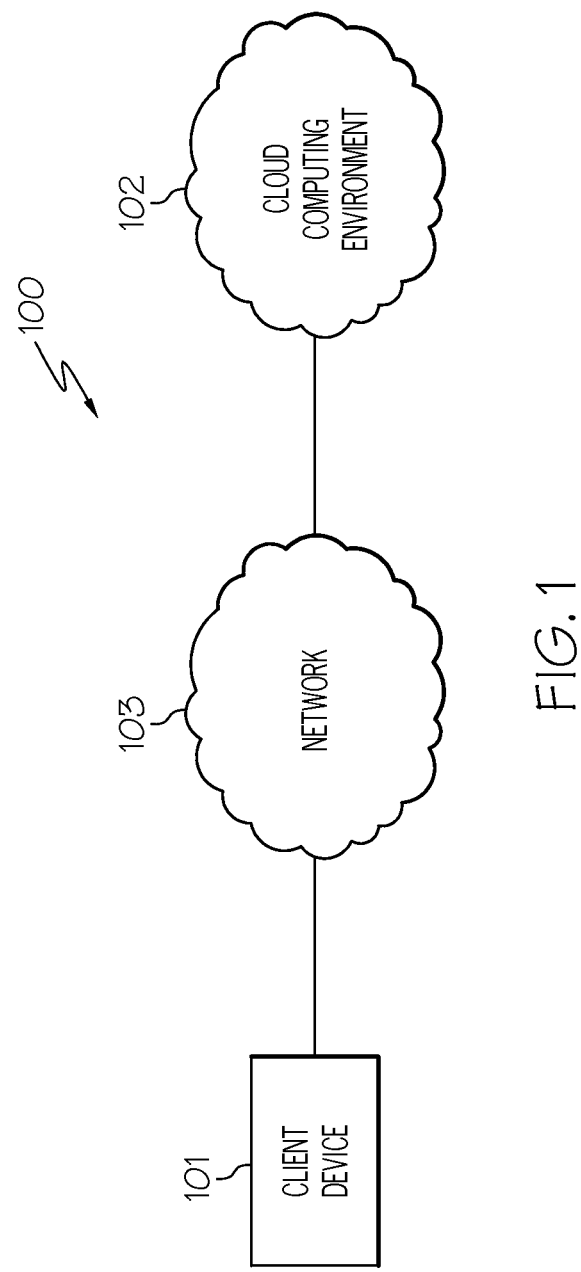
FIG. 1 illustrates a network system configured in accordance with an embodiment of the present invention.

The present invention comprises a method, system and computer program product for selecting an optimal transport protocol in a cloud computing environment. In one embodiment of the present invention, an application creates a socket to communicate with a destination host (e.g., virtual machine running on a hardware host). The application requests a daemon agent to query a virtual machine manager to determine if the destination host is on the same hypervisor as the application. The daemon agent receives a Virtual Machine Communication Interface (VMCI) address (also referred to as a context ID) and an indication of the hypervisor associated with the destination virtual machine from the virtual machine manager. The daemon agent enables the transport layer to route traffic over the VMCI protocol to the destination virtual machine using the context ID of the destination virtual machine in response to the destination host being on the same hypervisor as the application. In this manner, the application is able to route traffic using an optimal transport protocol, including VMCI, depending on peer hypervisor association without requiring any code modifications to the application.

While the following discusses the present invention in connection with selecting either the VMCI protocol or the TCP/UDP protocol, the principles of the present invention may be applied to selecting any two optimal transport protocols. Furthermore, the principles of the present invention may be applied to selecting between the VMCI protocol and any conventional transport protocol of the transport layer of the Internet protocol suite. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
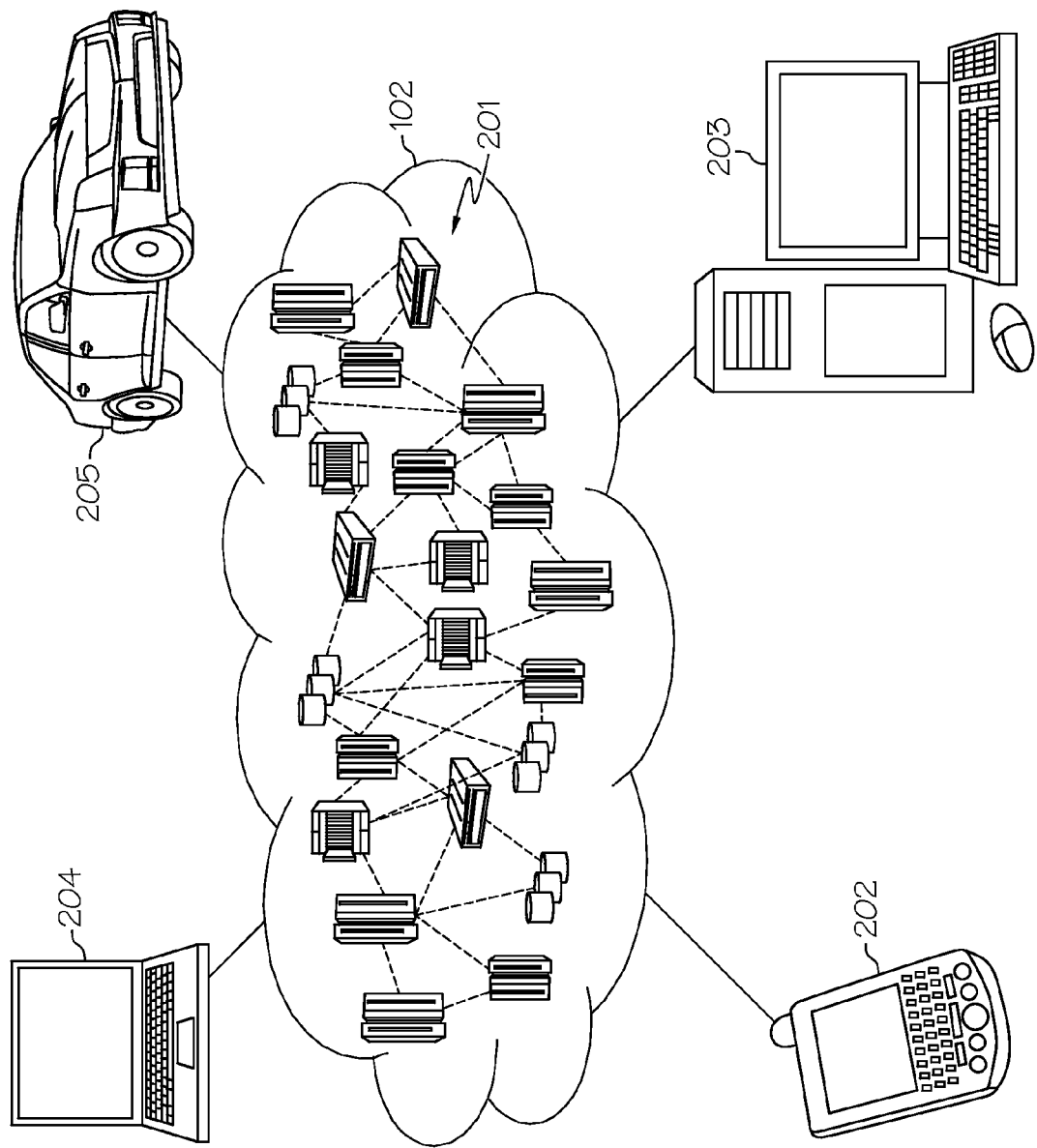
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
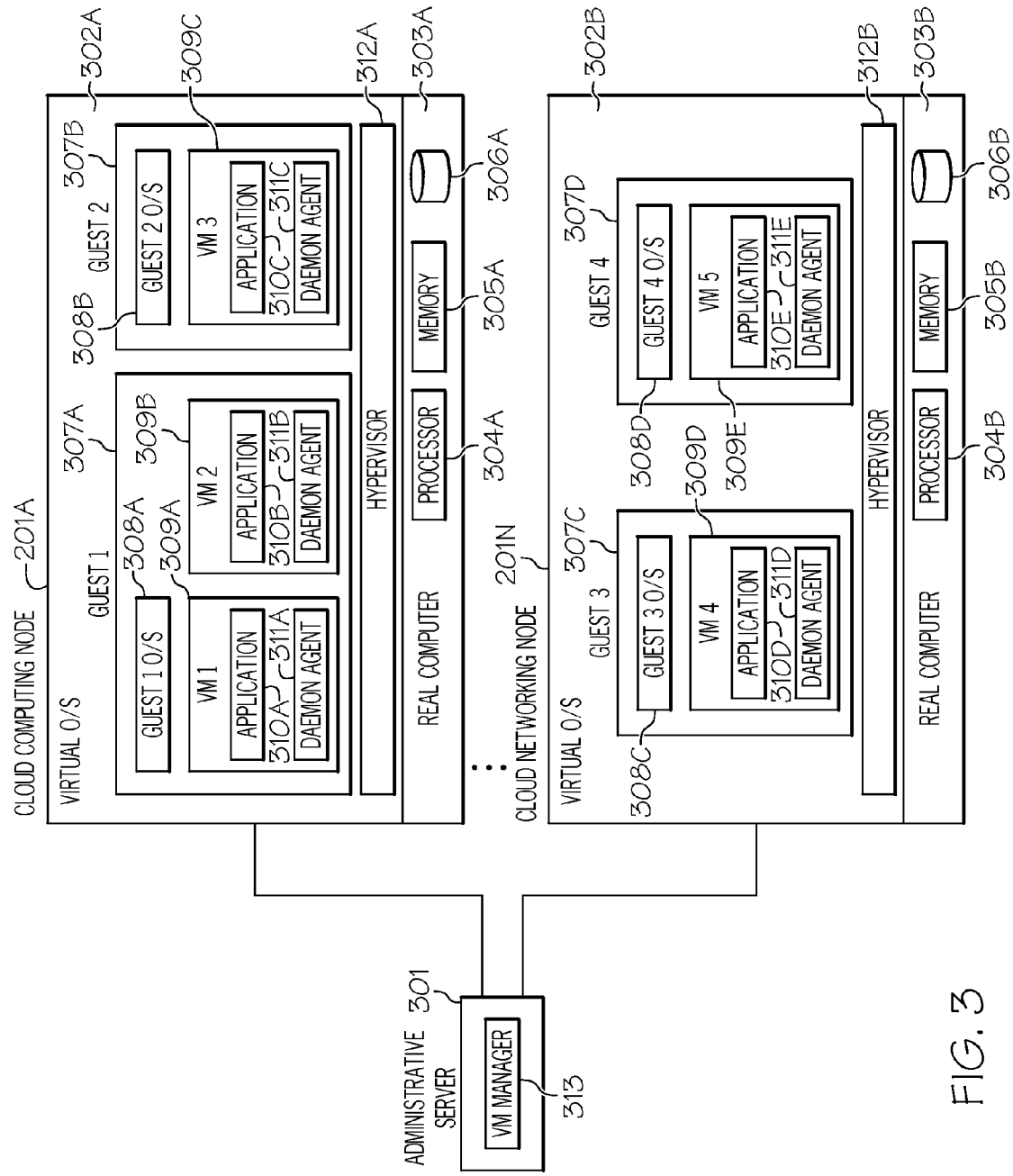
FIG. 3 illustrates a schematic of an exemplary cloud computing node in accordance with an embodiment of the present invention.

Referring now to FIG. 3, FIG. 3 illustrates cloud computing nodes 201A-N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-N are each coupled to an administrative server 301 configured to provide data center-level functions of communicating with hypervisors on cloud computing nodes 201 to install virtual machines, terminate virtual machines and move virtual machines from one cloud computing node 201 to another within the data center.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Each virtual machine 309A-309C runs an application program 310A-310C and a daemon agent 311A-311C, respectively. Virtual machines 309A-309C are a module of automated computing machinery, configured by a hypervisor, to allow application 310A-310C and daemon agent 311A-311C to share the underlying physical machine resources of cloud computing node 201A, the processor 304A, memory 305A and so on. A more detailed discussion of the use of application 310A-310C and daemon agent 311A-311C in connection with selecting the optimal transport protocol (e.g., Virtual Machine Communication Interface (VMCI), Transmission Control Protocol (TCP)) in a cloud computing environment is provided further below in connection with FIGS. 4-7.

Virtual operating system 302A further includes a common base portion 312A, referred to herein as a hypervisor. Hypervisor 312A may be implemented in microcode running on processor 304A or it may be implemented in software as part of virtual operating system 302A. Hypervisor 312A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud networking 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Applications 310D-310E and daemon agents 311D-311E are functionally the same as applications 310A-C and daemon agents 311A-C, respectively. Furthermore, hypervisor 312B is functionally the same as hypervisor 312A. Hence, the discussion of cloud computing node 201A applies to each cloud computing node 201, including cloud computing node 201N.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Applications 310A-310E may collectively or individually be referred to as applications 310 or application 310, respectively. Daemon agents 311A-311E may collectively or individually be referred to as daemon agents 311 or daemon agent 311, respectively. Hypervisors 312A-312B may collectively or individually be referred to as hypervisors 312 or hypervisor 312, respectively.

FIG. 3 is not to be limited in scope to a particular number of cloud computing nodes 201 and each cloud computing node 201 may include any number of guests 307, guest operating systems 308, virtual machines 309, applications 310, daemon agents 311, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the Virtual Machine ("VM") manager 313, that implements direct communications with VMs 309 through modules called VM agents (not shown in FIG. 3) installed in VMs 309 themselves. Additionally, in some embodiments, VM manager 313 is responsible for lifecycle management of virtual resources, efficient utilization of physical resources, and for exposing basic application programming interfaces (APIs) for operations to users. Further functionality of VM manager 313 is discussed below in connection with FIGS. 4-7.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, since the VMCI protocol only provides communication within the local hypervisor, the VMCI sockets (socket provides a bidirectional communication endpoint for sending and receiving data with another socket) only communicate from guest to guest as well as between a guest to a host on a single host. VMCI sockets cannot be used for communicating between virtual machines running on two separate physical machines or from one host to another host across a network. Instead, the application has to rely upon TCP/IP to communicate with external hosts. Since the application layer (application layer contains all protocols and methods that fall into the realm of process-to-process communications) does not have visibility to the underlying virtual infrastructure to determine whether it should communicate over VMCI (if communicating on the same host) or over TCP (if communicating over a different host), the application resorts to using TCP since virtual machines can migrate to new hosts as workload demands change. As a result, despite the benefits of using the VMCI protocol over the TCP protocol, the use of the VMCI protocol in a virtualized computer environment in a cloud computing node of the cloud computing environment is currently impractical.

Figure 4:
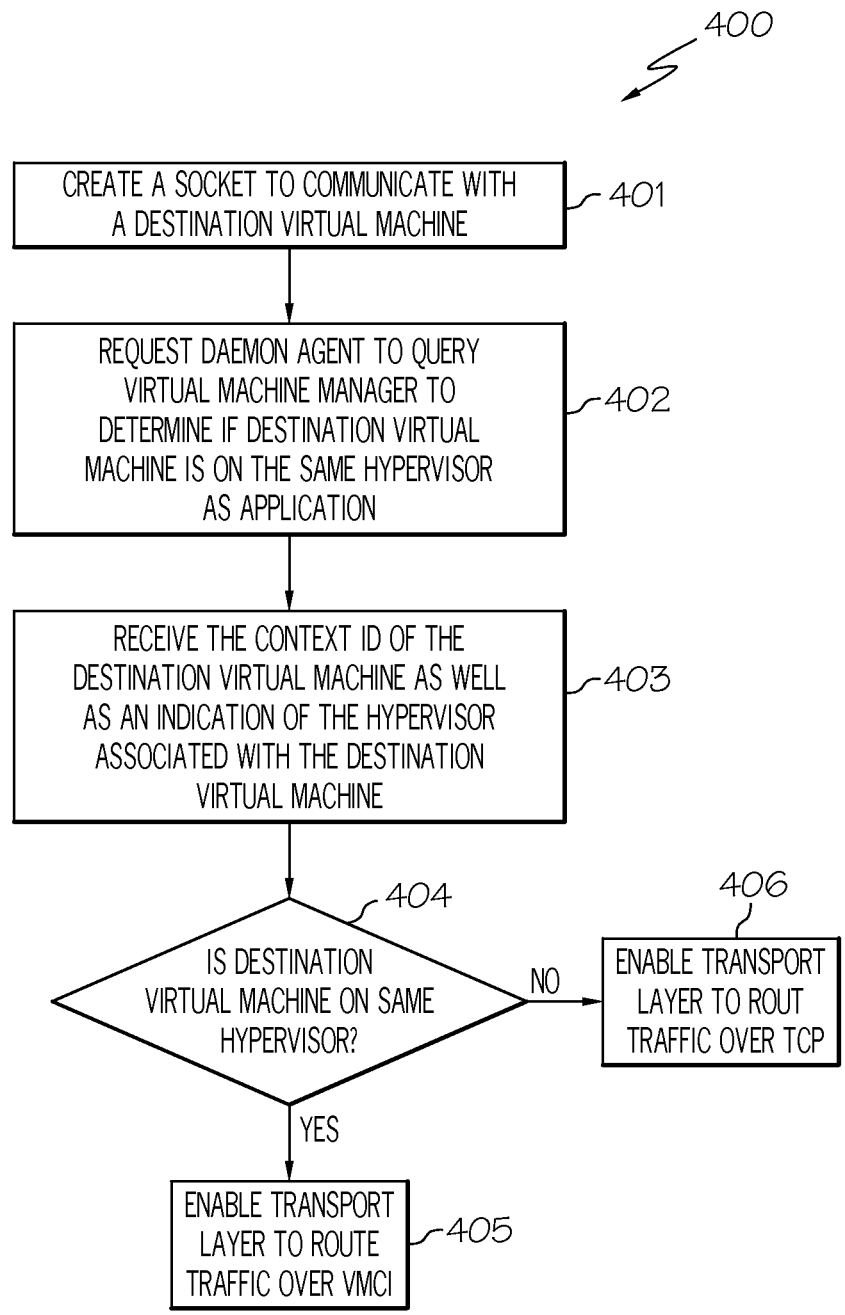
FIG. 4 is a flowchart of a method for selecting the optimal transport protocol depending on peer hypervisor association in accordance with an embodiment of the present invention.

The principles of the present invention provide a means for automatically selecting the optimal transport protocol, including the Virtual Machine Communication Interface (VMCI) protocol, in a cloud computing environment without requiring any code modifications to the applications as discussed below in connection with FIGS. 4-7. FIG. 4 is a flowchart of a method for selecting the optimal transport protocol (e.g., VMCI, TCP) depending on peer hypervisor association.

Figure 5:
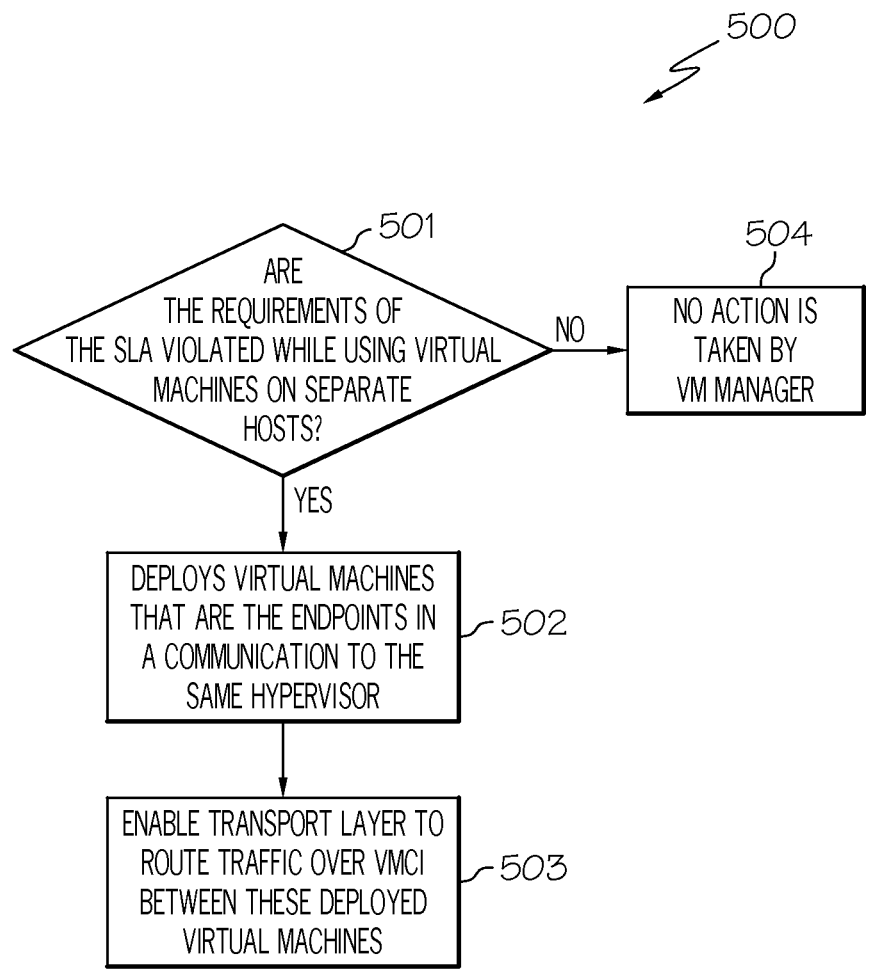
FIG. 5 is a flowchart of a method for enabling high performance network quality of service via the use of the VMCI protocol in accordance with an embodiment of the present invention.
Figure 6:
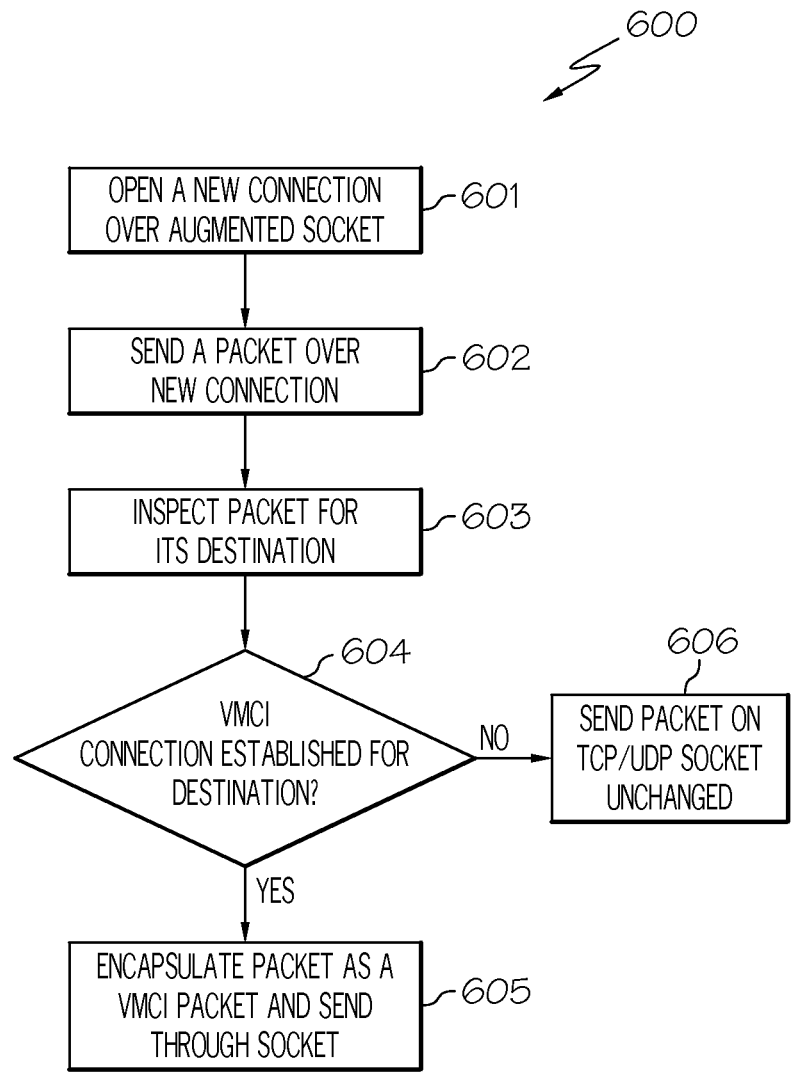
FIG. 6 is a flowchart of a method for ensuring persistent communication by seamlessly transitioning from a VMCI socket to a TCP/UDP socket.
Figure 7:
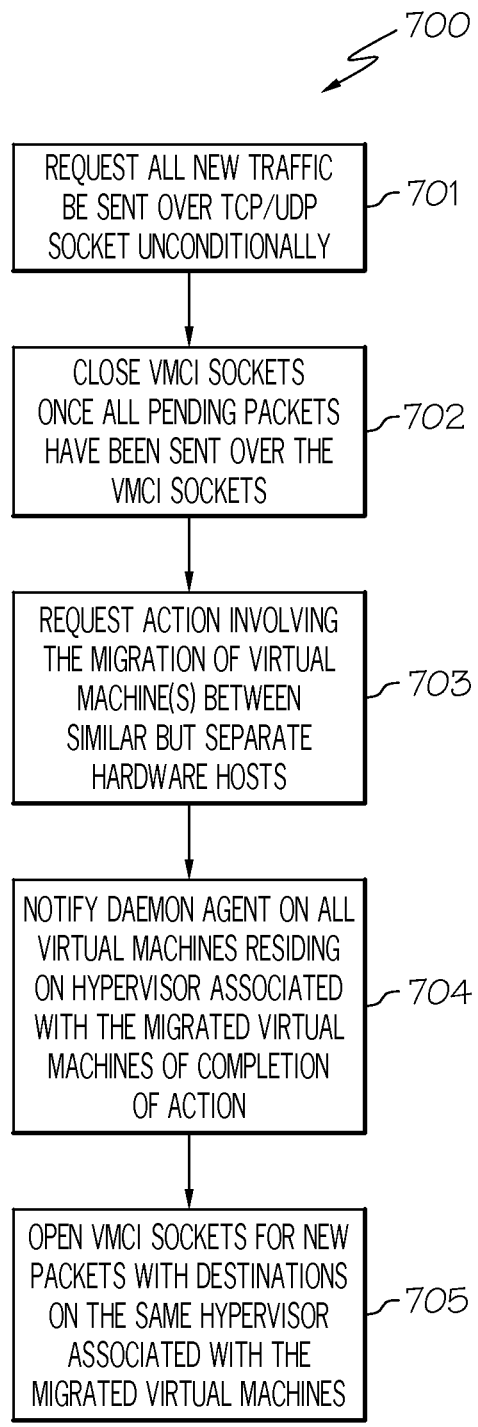
FIG. 7 is a flowchart of a method for ensuring persistent communication when virtual machines migrate between separate hardware hosts in accordance with an embodiment of the present invention.

FIG. 5 is a flowchart of a method for enabling high performance network quality of service via the use of the VMCI protocol. FIG. 6 is a flowchart of a method for ensuring persistent communication by seamlessly transitioning from a VMCI socket to a TCP/UDP socket. FIG. 7 is a flowchart of a method for ensuring persistent communication when virtual machines migrate between separate hardware hosts.

FIG. 4 is a flowchart of a method 400 for selecting the optimal transport protocol (e.g., VMCI, TCP) depending on peer hypervisor association in accordance with an embodiment of the present invention.

Referring to FIG. 4, in conjunction with FIGS. 1-3, in step 401, application 310 (e.g., application 310A) creates a socket to communicate with a destination virtual machine (e.g., virtual machine 309D operating on real computer 303B).

In step 402, application 310 requests daemon agent 311 (e.g., daemon agent 311A) to query VM manager 313 to determine if the destination virtual machine is on the same hypervisor 312 (e.g., hypervisor 312A) as application 310.

In step 403, daemon agent 311 receives the context identification ("ID") of the destination virtual machine 309 as well as an indication of the hypervisor 312 associated with the destination virtual machine 309 from VM manager 313. In one embodiment, each virtual machine 309 is provided with a VMCI address, referred to herein as a context identification ("ID"). VM manager 313 is responsible for deploying virtual machines 309 to cloud computing environment 102 and will therefore have the knowledge regarding the context ID of virtual machine 309 as well as the particular hypervisor 312 associated with virtual machine 309. As a result, VM manager 313 could provide daemon agent 311 with the context ID for virtual machine 309 as well as the particular hypervisor 312 associated with virtual machine 309.

In step 404, daemon agent 311 determines whether the destination virtual machine is on the same hypervisor 312 as application 310. Since daemon agent 311 receives the indication of hypervisor 312 associated with the destination virtual machine 309, daemon agent 311 would know whether the destination virtual machine 309 is on the same hypervisor 312 as application 310. If the destination virtual machine (e.g., virtual machine 309C operating on real computer 303A) is operating on the same hypervisor 312 (e.g., hypervisor 312A) as application 310 (e.g., application 310A), then, in step 405, daemon agent 311 will enable the transport layer to route traffic over VMCI to the destination virtual machine 309. Daemon agent 311 enables the transport layer to route traffic over VMCI to the destination virtual machine 309 using the acquired context ID of the destination virtual machine 309. Otherwise, in step 406, daemon agent 311 will enable the transport layer to route traffic over TCP or some other conventional transport protocol, such as User Datagram Protocol (UDP), to the destination virtual machine 309 using the acquired context ID of the destination virtual machine 309. In this manner, the application is able to route traffic using an optimal transport protocol, including VMCI, depending on peer hypervisor association.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

A Service-Level Agreement ("SLA") is a part of a service contract where the level of service (e.g., data rates, throughput) is formally defined. In order to optimize performance and efficiently maintain workload according to the service-level agreement, the knowledge of virtual machine 309 (FIG. 3) placement may be utilized as discussed below in connection with FIG. 5. FIG. 5 is a flowchart of a method 500 for enabling high performance network quality of service via the use of the VMCI protocol.

Referring to FIG. 5, in conjunction with FIGS. 1-3, in step 501, VM manager 313 determines if the requirements of the SLA (e.g., high data rate, high throughput) are violated while using virtual machines 309 on separate hosts 303.

If the requirements of the SLA (e.g., high data rate, high throughput) are violated while using virtual machines 309 on separate hosts 303, then in step 502, VM manager 313 deploys virtual machines 309 that are the endpoints in a communication to the same hypervisor 312 (including evicting other virtual machines 309 if needed to satisfy the requirements of the SLA).

In step 503, daemon agent 311 enables the transport layer to route traffic over VMCI between these deployed virtual machines.

If, however, the requirements of the SLA (e.g., high data rate, high throughput) are not violated while using virtual machines 309 on separate hosts 303, then, in step 504, no action is taken by VM manager 313.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

Ensuring uninterrupted communication is accomplished by seamlessly transitioning from a VMCI socket to a TCP/UDP socket as discussed below in connection with FIG. 6.

FIG. 6 is a flowchart of a method 600 for ensuring persistent communication by seamlessly transitioning from a VMCI socket to a TCP/UDP socket in accordance with an embodiment of the present invention.

Referring to FIG. 6, in conjunction with FIGS. 1-3, in step 601, application 310 opens a new connection over a socket (e.g., application 310A opens a new connection over a socket to communicate with virtual machine 309C), where such a socket is augmented with the ability to communicate over VMCI or TCP/UDP.

In step 602, application 310 sends a packet over the new connection.

In step 603, the TCP/IP stack implementation inspects the packet for its destination. For example, the TCP/IP stack implementation may inspect the header of the packet for its destination.

In step 604, daemon agent 311 determines if a VMCI connection has been established for its destination.

If a VMCI connection has been established for its destination, then, in step 605, daemon agent 311 encapsulates the packet as a VMCI packet and sends it through the socket.

If, however, a VMCI connection has not been established for its destination, then, in step 606, daemon agent 311 the packet on the TCP/UDP socket unchanged.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

Persistent communication can further be ensured when virtual machines migrate between separate hardware hosts as discussed below in connection with FIG. 7.

FIG. 7 is a flowchart of a method 700 for ensuring persistent communication when virtual machines 309 (FIG. 3) migrate between separate hardware hosts 303 (FIG. 3) in accordance with an embodiment of the present invention.

Referring to FIG. 7, in conjunction with FIGS. 1-3, in step 701, VM manager 313 requests that all new traffic be sent over the TCP/UDP socket unconditionally.

In step 702, VM manager 313 closes the VMCI sockets once all pending packets have been sent over the VMCI sockets.

In step 703, VM manager 313 requests the action involving the migration of virtual machine(s) 309 between similar but separate hardware hosts 303. For example, VM manager 313 may request the migration of virtual machine 309A on hardware host 303A to hardware host 303B.

In step 704, upon completion of the migration action, VM manager 313 notifies daemon agent 311 on all virtual machines 309 residing on hypervisor 312 associated with the migrated virtual machines 309 of the completion of the action. For example, VM manager 313 notifies daemon agent 310D-310E on all virtual machines 309D-309E on hypervisor 312B associated with the migrated virtual machine 309A (migrated from host 303A to host 303B) of the completion of the action.

In step 705, daemon agent 311 opens VMCI sockets for new packets with destinations on the same hypervisor 312 (e.g., hypervisor 312B) associated with the migrated virtual machines 309 (virtual machine 309A migrated from host 303A to host 303B). For example, daemon agent 311 opens VMCI sockets for new packets being sent by application 310D to the migrated virtual machine 309 (virtual machine 309A migrated from host 303A to host 303B) that is associated with the same hypervisor 312 (e.g., hypervisor 312B) as application 310D.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for selecting an optimal transport protocol in a cloud computing environment, the method comprising:
   creating a socket to communicate with a destination virtual machine by an application;
   requesting a daemon agent executed within a virtual machine hosting the application, by the application, to query a virtual machine manager to determine if said destination virtual machine is on a same hypervisor as said application, wherein the virtual machine manager executes independently from said same hypervisor;

receiving a context identification of said destination virtual machine and an indication of a hypervisor associated with said destination virtual machine from said virtual machine manager; and enabling, by a processor, a transport layer to route traffic over a first transport protocol to said destination virtual machine using said context identification of said destination virtual machine in response to said destination virtual machine being on said same hypervisor as said application.

2. The method as recited in claim 1 further comprising:

enabling said transport layer to route traffic over a second transport protocol to said destination virtual machine using said context identification of said destination virtual machine in response to said destination virtual machine not being on said same hypervisor as said application.

3. The method as recited in claim 2, wherein said first transport protocol comprises a Virtual Machine Communication Interface (VMCI) protocol and a second transport protocol comprises a Transmission Control Protocol (TCP).

4. The method as recited in claim 1 further comprising:

deploying virtual machines that are endpoints in a communication to said same hypervisor in response to requirements of a service-level agreement being violated while using said virtual machines on separate hosts; and enabling said transport layer to route traffic over said first transport protocol between said deployed virtual machines.

5. The method as recited in claim 1 further comprising:

opening a new connection over said socket;

sending a packet over said new connection;

inspecting said packet for its destination;

encapsulating said packet as a packet for said first transport protocol in response to said first transport protocol being established for said destination; and sending said encapsulated packet over said socket.

6. The method as recited in claim 1 further comprising:

requesting all new traffic be sent over a socket for a second transport protocol unconditionally;

closing sockets for said first transport protocol once all pending packets have been sent over said sockets for said first transport protocol;

requesting an action involving a migration of one or more virtual machines between separate hosts;

notifying a daemon agent on a virtual machine residing on a hypervisor associated with said migrated one or more virtual machines that said action is completed; and opening sockets for said first transport protocol for new packets with destinations on said hypervisor associated with said migrated one or more virtual machines.

* * * * *